US010315166B2

(12) United States Patent
Yang et al.

(10) Patent No.: US 10,315,166 B2
(45) Date of Patent: Jun. 11, 2019

(54) ETCHING MASK, MANUFACTURING METHOD THEREFOR, POROUS MEMBRANE MANUFACTURING METHOD USING ETCHING MASK, POROUS MEMBRANE, FINE DUST-BLOCKING MASK INCLUDING POROUS MEMBRANE, AND MANUFACTURING METHOD FOR SURFACE ENHANCED RAMAN SCATTERING ACTIVE SUBSTRATE

(71) Applicant: PUSAN NATIONAL UNIVERSITY INDUSTRY UNIVERSITY CORPORATION FOUNDATION OF PUSAN, Busan (KR)

(72) Inventors: Seung Yun Yang, Daegu (KR); Seunghyun Lee, Busan (KR); Sang-Gu Yim, Busan (KR)

(73) Assignee: PUSAN NATIONAL UNIVERSITY INDUSTRY UNIVERSITY COOPERATION FOUNDATION OF PUSAN, Busan (KR)

( * ) Notice: Subject to any disclaimer, the term of this patent is extended or adjusted under 35 U.S.C. 154(b) by 31 days.

(21) Appl. No.: 15/507,198

(22) PCT Filed: Aug. 28, 2015

(86) PCT No.: PCT/KR2015/009033
§ 371 (c)(1),
(2) Date: Feb. 27, 2017

(87) PCT Pub. No.: WO2016/032270
PCT Pub. Date: Mar. 3, 2016

(65) Prior Publication Data
US 2017/0282127 A1 Oct. 5, 2017

(30) Foreign Application Priority Data

Aug. 29, 2014 (KR) .................. 10-2014-0114033
Aug. 29, 2014 (KR) .................. 10-2014-0114040

(51) Int. Cl.
B01D 67/00 (2006.01)
B01D 71/02 (2006.01)

(52) U.S. Cl.
CPC ..... *B01D 67/0034* (2013.01); *B01D 67/0079* (2013.01); *B01D 71/022* (2013.01);
(Continued)

(58) Field of Classification Search
None
See application file for complete search history.

(56) References Cited

U.S. PATENT DOCUMENTS 4,470,871 A * 9/1984 White .................. B29C 59/14
204/192.32
6,258,732 B1 * 7/2001 Lin .................. H01L 21/0335
257/E21.037
(Continued)

FOREIGN PATENT DOCUMENTS

KR 10-2005-0078975 8/2005
KR 10-2009-0000428 1/2009
(Continued)

OTHER PUBLICATIONS

International Search Report and Written Opinion issued in PCT/KR2015/009033, dated Dec. 10, 2015.

*Primary Examiner* — Roberts P Culbert
(74) *Attorney, Agent, or Firm* — Norton Rose Fulbright US LLP

(57) ABSTRACT

The present disclosure provides an etching mask, a method for manufacturing the same, a method for manufacturing a porous membrane using the same, a porous membrane, a fine dust blocking mask including the same, and a method for manufacturing a surface enhanced Raman scattering active substrate. In this connection, the etching mask includes an organic film; and a pattern layer disposed on the organic film, wherein the pattern layer has openings defined
(Continued)

therein having a uniform size, wherein each of the openings includes a micro-scale or nano-scale hole.

8 Claims, 6 Drawing Sheets

(52) U.S. Cl.
CPC ........ B01D 71/024 (2013.01); *B01D 2323/34* (2013.01); *Y02P 20/582* (2015.11)

(56) References Cited

U.S. PATENT DOCUMENTS

| | | | |
|---|---|---|---|
| 6,613,241 B1* | 9/2003 | Scherer | B01D 67/0065 216/17 |
| 2003/0194647 A1* | 10/2003 | Huang | G03F 7/11 430/271.1 |
| 2005/0069788 A1* | 3/2005 | Tanaka | G03F 1/29 430/5 |

FOREIGN PATENT DOCUMENTS

| | | |
|---|---|---|
| KR | 10-2009-0004180 | 1/2009 |
| KR | 10-2013-0142090 | 12/2013 |
| KR | 10-1358143 | 2/2014 |

* cited by examiner

ETCHING MASK, MANUFACTURING METHOD THEREFOR, POROUS MEMBRANE MANUFACTURING METHOD USING ETCHING MASK, POROUS MEMBRANE, FINE DUST-BLOCKING MASK INCLUDING POROUS MEMBRANE, AND MANUFACTURING METHOD FOR SURFACE ENHANCED RAMAN SCATTERING ACTIVE SUBSTRATE

CROSS-REFERENCE TO RELATED APPLICATIONS

The present application is a national phase application under 35 U.S.C. § 371 of International Application No. PCT/KR2015/009033 filed Aug. 28, 2015, which claims priority to Korean patent application No. 10-2014-0114033 filed Aug. 29, 2014 and Korean patent application No. 10-2014-0114040 filed Aug. 29, 2014. The entire contents of each of the above-referenced applications are incorporated into the present application by reference.

BACKGROUND

Field of the Present Disclosure

The present disclosure relates to an etching mask, a method for manufacturing the same, a method for manufacturing a porous membrane using the same, a porous membrane, a fine dust blocking mask including the same, and a method for manufacturing a surface enhanced Raman scattering active substrate. More particularly, the present disclosure relates to a mask for plasma etching, a method for manufacturing the same, a method for manufacturing a porous membrane using the same, a porous membrane, a fine dust blocking mask including the same, and a method for manufacturing a surface enhanced Raman scattering active substrate.

Discussion of Related Art

Generally, a fine dust barrier mask for filtering contaminants in the air collects fine dusts using pores between fine fibers in a nonwoven fabric in which the fine fibers are spun. In this connection, since it is not easy to control the fine dust blocking mask so as to have a uniform size of pores, and the size of the pores is microscale, there is a limit in collecting ultrafine dust of 0.1 micrometer or less or nanoscale. In order to address this, there is an attempt to apply a pore membrane having nano-pores having a uniform size onto the fine dust barrier mask. However, when the pore membrane is too thick, the pressure required to breathe is high. On the contrary, when the thickness of the porous membrane is too small, the flexure strength, i.e., the strength against bending deformation, is low, resulting in easy destruction of the mask. Therefore, it is necessary to develop a porous membrane suitable for the fine dust barrier mask, wherein the membrane has a small thickness and is easy to form fine pores therein and is made of a material having a high flexure strength.

The porous membrane is manufactured by various methods. For example, the porous membrane may be formed by patterning a flat film using an etching prevention mask having patterns corresponding to pores respectively. It is difficult to finely form the pattern on the nano scale. Therefore, the etching prevention mask is expensive. The flat film may be damaged during the patterning process of the flat film and cannot be reused. Therefore, the manufacturing cost of the porous membrane using the etching prevention mask is increased.

Recently, Surface Enhanced Raman Scattering (SERS) technology has been developed. SERS technology has been widely applied to the development of sensors capable of detecting various biomaterials and chemical substances. In SERS technology, an active substrate having a nanostructure generally embossed or engraved is being fabricated by electron beam lithography. The lithography may be performed by exposing a photosensitive resist coated on a conductive substrate using an electron beam, and developing the resist to form a resist pattern, and then applying a metal layer thereon, and the lifting off the resist pattern.

Since the lithography has a large number of processes, a long process time, and have many factors to be controlled in each process, it is difficult to secure process reliability. In addition, a portion of the metal layer may be easily peeled which should remain in the lift-off process, and, thus frequency of occurrence of defections may be high. In order to solve this problem, it has been proposed to form an interlayer film for improving the adhesion between the metal layer and the conductive substrate. However, the SERS activity is lowered by the interlayer film.

SUMMARY

The present disclosure has been made to solve the above problems. Thus, an object of the present disclosure is to provide an etching mask capable of forming fine pores of a porous membrane and being usable repeatedly.

Another object of the present disclosure is to provide a method for manufacturing the etching mask by a simple process.

It is still another object of the present disclosure to provide a method for manufacturing the porous membrane using the etching mask.

A further object of the present disclosure is to provide a porous membrane having a small thickness, and an effective flexure strength and fine pores.

It is still another object of the present disclosure to provide a fine dust barrier mask comprising the porous membrane.

It is still another object of the present disclosure to provide a method for easily producing a surface enhanced Raman scattering active substrate by a simple process.

In one aspect of the present disclosure, there is provided an etching mask comprising: an organic film; and a pattern layer disposed on the organic film, wherein the pattern layer has openings defined therein having a uniform size, wherein each of the openings includes a micro-scale or nano-scale hole.

In one embodiment of the etching mask, the pattern layer has a metal or a metal oxide as a surface portion thereof, or the pattern layer is made of a metal or a metal oxide.

In one embodiment of the etching mask, each of the openings is partially infiltrated with the organic film.

In one embodiment of the etching mask, the organic film is exposed through the openings in the pattern layer.

In one embodiment of the etching mask, the organic film has holes defined therein corresponding to the openings in the pattern layer respectively.

In one aspect of the present disclosure, there is provided a method for manufacturing an etching mask, the method comprising: providing an organic film; and forming a pattern layer on the organic film, wherein the pattern layer has openings defined therein, wherein each of the openings includes a micro-scale or nano-scale hole.

In one embodiment of the method for manufacturing the etching mask, forming the pattern layer on the organic film comprises: placing the pattern layer on the organic film; heating the organic film together with the pattern layer to a temperature equal to or above a glass transition temperature of the organic film under a vacuum or reduced pressure; and cooling the pattern layer and the organic film.

In one embodiment of the method for manufacturing the etching mask, forming the pattern layer on the organic film comprises: providing a metal layer; partially anodizing the metal layer to form a metal oxide layer; removing a portion of the metal oxide layer from the metal layer; and placing the removed portion of the metal oxide layer on the organic film.

In one embodiment of the method for manufacturing the etching mask, the pattern layer is formed by coating a metal or metal oxide on an imprint pattern, or by etching a metal layer or a metal oxide film.

In one embodiment of the method for manufacturing the etching mask, the organic film is exposed through the openings in the pattern layer, wherein the method further comprises, after forming the pattern layer, forming holes in the organic film by removing the exposed organic film through the openings.

In one aspect of the present disclosure, there is provided a method for manufacturing a porous membrane, the method comprising: providing a polymer film; placing an etching mask on the polymer film, wherein the etching mask includes an organic film contacting the polymer film, and a pattern layer disposed on the organic film, wherein the pattern layer has openings defined therein, wherein each of the openings includes a micro-scale or nano-scale hole; and forming multiple through-holes in the polymer film by plasma-etching the polymer film using the etching mask.

In one embodiment of the method for manufacturing the porous membrane, the openings in the pattern layer have a uniform size.

In one embodiment of the method for manufacturing the porous membrane, the method further comprises, after forming the through-holes, removing the etching mask from the polymer film without damaging the organic film and the polymer film.

In one embodiment of the method for manufacturing the porous membrane, the polymer film includes an elastic polymer film made of an elastomer.

In one embodiment of the method for manufacturing the porous membrane, forming the through-holes comprises etching the organic film and the polymer film using oxygen plasma.

In one embodiment of the method for manufacturing the porous membrane, the organic film has holes defined therein corresponding to the openings in the pattern layer respectively.

In one aspect of the present disclosure, there is provided a porous membrane including an elastic polymer film made of an elastomer, wherein the elastic polymer film has multiple through-holes defined therein, wherein each of the through-holes has micro-scale or nano-scale.

In one embodiment of the porous membrane, the through-holes have a uniform size.

In one aspect of the present disclosure, there is provided a fine dust barrier mask including a porous membrane including an elastic polymer film made of an elastomer, wherein the elastic polymer film has multiple through-holes defined therein, wherein each of the through-holes has micro-scale or nano-scale.

In one embodiment of the fine dust barrier mask, the mask further comprises first and second filter layers sandwiching the porous membrane therebetween.

In one aspect of the present disclosure, there is provided a method for manufacturing a surface enhanced Raman scattering (SERS) active substrate, the method comprising: providing a base substrate; placing an etching mask on the base substrate, wherein the etching mask includes an organic film, and a pattern layer disposed on the organic film, wherein the pattern layer has openings defined therein, wherein each of the openings includes a micro-scale or nano-scale hole; defining multiple pores in the base substrate by plasma-etching the base substrate using the etching mask; and forming a metal layer on the base substrate having the pores defined therein.

In one embodiment of the method for manufacturing the SERS active substrate, the organic film is partially exposed through the openings in the pattern layer, wherein the plasma-etching partially etches the organic film and the base substrate.

In one embodiment of the method for manufacturing the SERS active substrate, the organic film has holes defined therein corresponding to the openings in the pattern layer respectively.

In one embodiment of the method for manufacturing the SERS active substrate, the pattern layer is made of a metal oxide.

In one embodiment of the method for manufacturing the SERS active substrate, the method further comprises forming the etching mask, wherein forming the etching mask includes: providing a metal layer; partially anodizing the metal layer to form a metal oxide layer; removing a portion of the metal oxide layer from the metal layer; and placing the removed portion of the metal oxide layer as the pattern layer on the organic film. In this connection, forming the etching mask further includes: heating the organic film together with the pattern layer to a temperature equal to or above a glass transition temperature of the organic film under a vacuum or reduced pressure; and cooling the pattern layer and the organic film.

In one embodiment of the method for manufacturing the SERS active substrate, the base substrate is made of a polymer.

In one embodiment of the method for manufacturing the SERS active substrate, the metal layer is made of at least one selected from a group consisting of gold (Au), silver (Ag), copper (Cu), palladium (Pd), platinum (Pt), aluminum (Al), nickel (Ni), ruthenium (Ru), rhodium (Rh), iron (Fe), cobalt (Co), tin (Sn), zinc (Zn), and metal oxides thereof. Theses may be employed alone or in combination thereof.

In accordance with the etching mask, the method for manufacturing the same, the method for manufacturing the porous membrane using the same, the porous membrane, the fine dust blocking mask including the same, and the method for manufacturing the surface enhanced Raman scattering active substrate, the etching mask can be recycled without being damaged during the plasma etching process and can be manufactured by a simple method, thereby reducing the manufacturing cost of the etching mask and the cost of the plasma etching process using the etching mask. In addition, the porous membrane includes the elastomer, so that the thin membrane has an appropriate flexure strength ensured, and, further, can be easily fabricated using the etching mask. The adhesion of the etching mask can be improved during the process of manufacturing the porous membrane by maximizing the contact area between the elastomer and the etching mask. In addition, the etching mask can be easily removed from the elastomer in contact with the elastomer. Thus, after the etching process is completed, when the etching mask is removed from the elastomer, there is little damage to the organic film of the etching mask and the elastomer.

Further, the fine dust barrier mask has improved fine dust shielding ability and good fit with the wearer' body by including the porous membrane therein.

Accordingly, manufacturing reliability and productivity of each of the etching mask, the porous membrane and the fine dust barrier mask can be improved.

Moreover, the surface enhanced Raman scattering active substrate can be easily manufactured via a simple process including a step of etching using the etching mask including the organic film and pattern layer and a step of coating the metal layer. As a result, the manufacturing time can be shortened. Since the base substrate is already patterned to form the pores therein, and then, the metal layer is formed on the base substrate in a corresponding pattern to the pores pattern, a separate interlayer film for improving the adhesion of the metal layer is not required. In addition, since the etching mask used for manufacturing the surface enhanced Raman scattering active substrate may be reused, the manufacturing cost of the surface enhanced Raman scattering active substrate can be reduced by manufacturing the surface enhanced Raman scattering active substrate using the etching mask.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
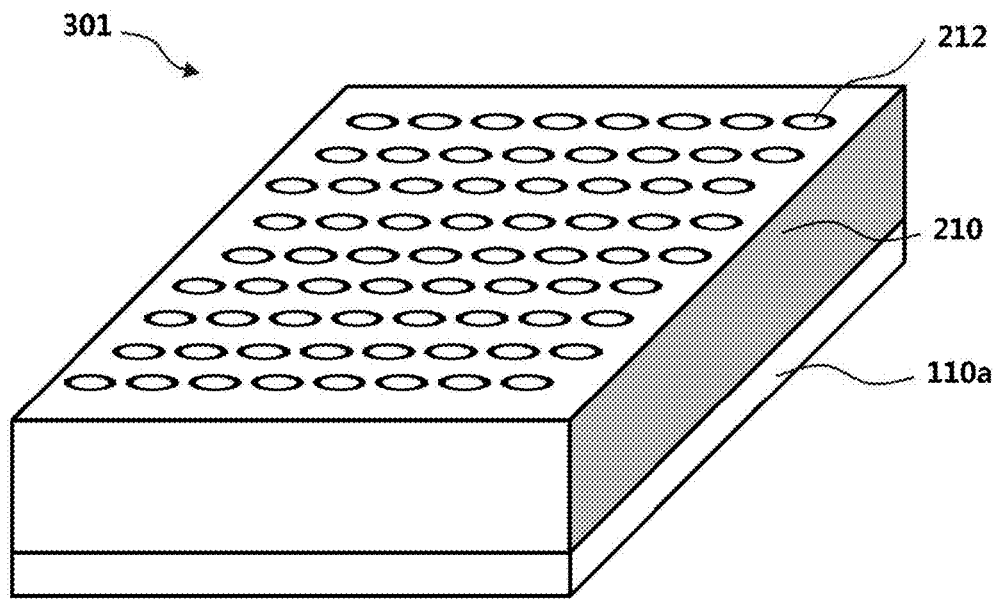
FIG. 1 is a perspective view of an etching mask according to one embodiment of the present disclosure.
Figure 2:
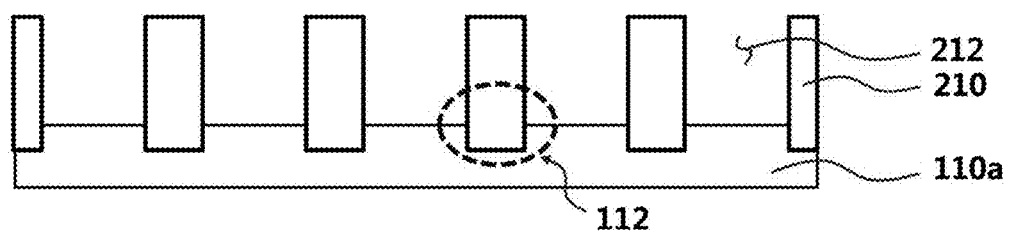
FIG. 2 is a cross-sectional view of the etching mask shown in FIG. 1.

FIG. 1 is a perspective view of an etching mask according to one embodiment of the present disclosure. FIG. 2 is a cross-sectional view of the etching mask shown in FIG. 1.

Referring to FIG. 1 and FIG. 2, an etching mask 301 may include an organic film 110a, and a pattern layer 210.

The organic film 110a may has a flat surface and may have a form of a film or sheet. In one example, the organic film 110a may have a thickness of 10 nm to 500 nm.

The organic film 110a may be made of a synthetic polymer or a natural polymer. Examples of the synthetic polymer may include polyethylene (PE), polypropylene (PP), polystyrene (PS), poly(vinyl chloride) (PVC), poly (methyl methacrylate) (PMMA), poly(vinyl acetate) (PVA), polyacrylonitrile (PAN), polytetrafluoroethylene (Teflon), polydicyclopentadiene, Poly(phenylene sulfide), carbon fiber, epoxy resin, polyester, polyamide, polychloroprene, polycarbonate, polyglycolide (PGA), polydimethylsiloxane (PDMS), etc. These may be used alone or in combination of two or more. Specific examples of the natural polymer may include cellulose, starch, chitin, chitosan, keratin, collagen, gelatin, alginate, hyaluronan, chondroitin sulfate, silk, nucleic acid (DNA), etc. These may be used alone or in combination of two or more. The organic film 110a may be formed using various polymers, such as an elastomeric elastomer, without being limited to the above examples of polymers forming the organic film 110a.

The pattern layer 210 may be disposed on the organic film 110a and include multiple openings 212. Each of the openings 212 may have a hole structure passing through the pattern layer 210 and may have a uniform size. In this connection, the uniform size of the openings 212 means that a width and depth of each of the openings 212 are uniform. Also, the openings 212 may be uniformly distributed throughout the pattern layer 210 as a whole. The surface of the organic film 110a may be partially exposed by the openings 212.

The pattern layer 210 may be formed of a metal oxide. The metal oxide may be formed by anodizing a metal. The metal oxide may be, for example, aluminum oxide. The thickness of the pattern layer 210 may be about 2 to 10 times the thickness of the organic film 110a.

Each of the openings 212 of the pattern layer 210 may have a form of a micro-hole having a micro-scale diameter or a nano-hole having a nanoscale diameter. Hereinafter, the term "microscale" means several micrometers to several hundred micrometers, and the term "nanoscale" means several nanometers to several hundreds of nanometers. For example, the diameter of each of openings 221 may be between 1 nm and 100 micrometers.

Each of the openings 212 may be partially infiltrated by the organic film 110a. Accordingly, a portion of the pattern layer 210 adjacent to the organic film 110a, that is, a lower end 112 of the pattern layer 210, may be partially surrounded by the organic film 110a. In the process of forming the pattern layer 210 on the organic film 110a, the bonding strength between the pattern layer 210 and the organic film 110a can be improved by heating and then cooling the organic film 110a. In this connection, using the heating treatment, each of the openings 212 may be partially infiltrated by the organic film 110a.

Figure 3A:
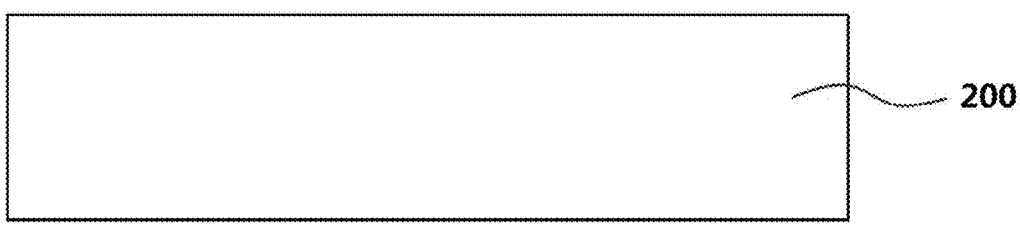
FIG. 3A, FIG. 3B and FIG. 3C are cross-sectional views for illustrating one embodiment of a method for manufacturing the etching mask shown in FIG. 2.
Figure 3B:
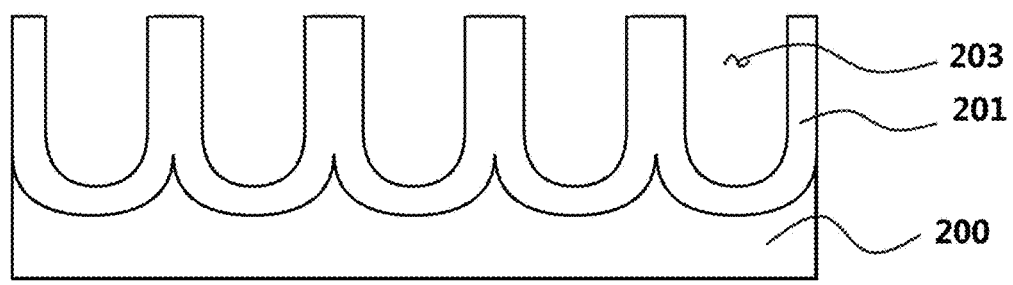
Figure 3C:
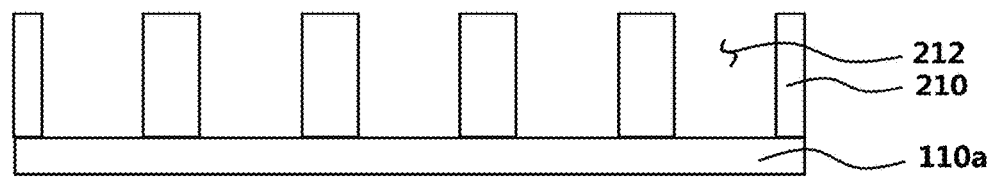

FIG. 3A, FIG. 3B and FIG. 3C are cross-sectional views for illustrating one embodiment of a method for manufacturing the etching mask shown in FIG. 2.

FIG. 3A and FIG. 3B are cross-sectional views for illustrating a process of forming the pattern layer 210, and FIG. 3C is a cross-sectional view for illustrating a process of forming the pattern layer 210 on the organic film 100a.

Referring to FIG. 3A and FIG. 3B, a metal layer 200 is first prepared to form a pattern layer 210. In this connection, the metal layer 200 may be an aluminum film, or may be made of pure aluminum alone, or an alloy film containing aluminum and a further metal.

The metal layer 200 is then anodized to form a metal oxide layer 201 at the surface of the metal layer 200. The metal contained in the metal layer 200 is oxidized by the anodizing process, and, thus, a portion of the metal layer 200 is converted into the metal oxide layer 201. The metal oxide layer 201 may comprise aluminum oxide. As the metal oxide layer 201 is formed, multiple pores 203 may be formed at the surface of the metal layer 200 and the pores 203 may be uniformly distributed over the metal layer 200. Each of the pores 203 may be defined by a bottom portion and a partition wall portion connected to the bottom portion. Each of the pores 203 may have a U-shaped cross section and a three-dimensional bell cross shape. The thickness of the metal oxide layer 201 or the depth and diameter of each of the pores 203 may be variously adjusted by changing the process conditions of anodization. The diameter of each of the pores 203 may be microscale or nanoscale.

Once the metal oxide layer 201 is formed, a portion of the metal oxide layer 201 is separated from the remaining metal layer 200. That is, the remaining metal layer 200 and the portion of the metal oxide layer 201 are removed to leave only the partition wall of the metal oxide layer 201. The partition wall is a portion of the metal oxide layer 201 forming the pore 230. In this connection, the partition wall of the remaining metal oxide layer 201 becomes the pattern layer 210 of the etching mask 301, and the diameter of the pore 201, which is the distance between the adjacent partition walls, is substantially equal to the width of the opening 212 in the pattern layer 210. The depth of the opening 212, i.e., the thickness of the pattern layer 210, may vary depending on the thickness of the remaining metal oxide layer 201.

Referring to FIG. 3C, the pattern layer 210 manufactured using the above process may be disposed on the organic film 110a. Then, the organic film 110a is heat-treated with the pattern layer 210 being disposed on the organic film 110a. The heat treatment process may be performed under vacuum or reduced pressure, and may be performed at a temperature equal to or higher than a glass transition temperature (Tg) of the organic film 110a. After the heat treatment, the organic film is cooled to a temperature lower than the glass transition temperature.

The organic phase 110a may be a liquid phase having a predetermined viscosity at a temperature higher than or equal to the glass transition temperature, and then may be a solid phase when cooled to a temperature lower than the glass transition temperature. Therefore, when the organic film 110a is thermally treated in the state that the pattern layer 210 is disposed thereon, the organic film 110a is phase-changed such that the lower end 112 of the pattern layer 210 is inserted into the organic film 110a. In other words, the opening 212 may be partially infiltrated with the organic film 110a. That is, while the lower end 112 of the pattern layer 210 is surrounded by the organic film 110a, the organic film 110 may be cooled, so that the bonding force between the organic film 110a and the pattern layer 210 can be improved.

In this way, the etching mask 301 having the structure shown in FIG. 1 and FIG. 2 has been prepared.

According to the above description, the etching mask 301 having the openings 212 uniformly distributed therein can be manufactured by a simple method. Further, the openings 212 of the pattern layer 210 can be formed to have a uniform size. Accordingly, the fabrication cost of the etching mask 301 and the cost of the plasma etching process using the etching mask 301 can be reduced. By using the etching mask 301, a pattern having a fine and uniform size can be easily formed.

Although not shown in the drawings, in another embodiment of the method for manufacturing the etching mask according to the present disclosure, an imprinting process may be used. That is, a mold having convex portions corresponding to the openings 212 in FIG. 1 is pressure-applied onto a base substrate, thereby form concave portions corresponding to the convex portions respectively in the substrate. The temperature can be raised during the step of applying the pressure. Then, a metal or metal oxide may be coated on the base substrate having the concave portions formed therein, i.e., the imprint pattern. Then, the imprint pattern and the coating layer may be separated from the base substrate. In this connection, the separated imprint pattern and coating layer together become a pattern layer of the etching mask. In this connection, an organic film may be attached to the bottom face of the imprint pattern to manufacture the etching mask in which the metal layer or the metal oxide layer is exposed to the outside. In summary, the pattern layer of the etching mask may have a structure including the imprint pattern defining a shape of the pattern layer and the coating layer coated on the surface of the imprint pattern and made of the metal or metal oxide.

In another embodiment of the method for fabricating the etching mask according to the present disclosure, an etching process may be used. That is, a metal layer may prepared and, then, holes corresponding to the openings 212 in FIG. 1 respectively may be patterned in the metal layer by an etching process to form a pattern layer. Then, an etching mask can be manufactured by attaching an organic film to one side of the pattern layer. Alternatively, the metal oxide layer may be patterned by etching to form a pattern layer.

Hereinafter, referring to FIG. 4, FIG. 5A and FIG. 5B, a porous membrane and a fine dust barrier mask according to one embodiment of the present disclosure, and a method for manufacturing the porous membrane using the etching mask above described in FIG. 1 and FIG. 2 will be described.

Figure 4:
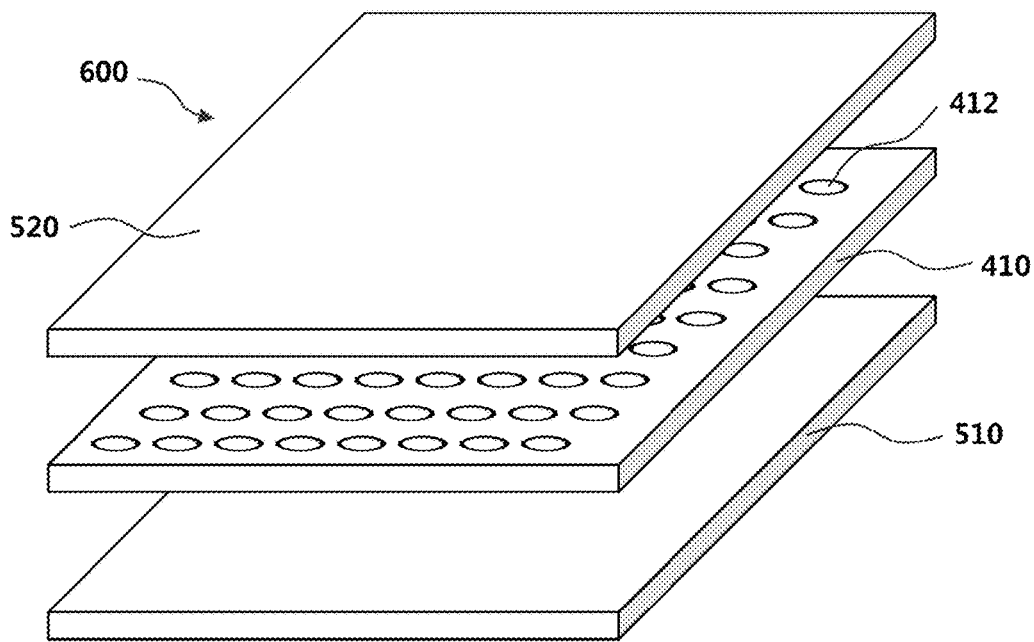
FIG. 4 is a perspective view of a mask for blocking fine dust according to one embodiment of the present disclosure.

FIG. 4 is a perspective view of a fine dust barrier mask according to an embodiment of the present disclosure.

Referring to FIG. 4, a fine dust barrier mask 600 may include a porous membrane 410 and two filter layers 510 and 520.

The porous membrane 410 may include a polymer film, and multiple through-holes 412 may be formed in the polymer film.

The polymer film may be an elastic polymer film made of an elastomer. Examples of the elastomer may include natural rubber, polyisoprene, polychloroprene, polybutadiene, styrene butadiene rubber (SBR), acrylonitrile butadiene rubber, ethylene propylene diene monomer, ethylene propylene diene monomer (EPDM), chlorosulfonated polyethylene (CSM), dibutoxyethoxyethyl adipate (DBEA), polyepichlorohydrin (PECH), polyurethane (PU), ethylene acrylic acid copolymer (EAA), tetrafluoro ethylene/propylene rubber (FEPM), perfluoro-elastomers (FFKM), polynorbornene, silicon and the like. These may be used alone or in combination of two or more.

Since the base portion of the porous membrane 410 is the elastic polymer film, the flexure strength of the fine dust barrier mask 600 can be maximized while lowering an air-intake resistance thereof.

Each of the through-holes 412 may be a microscale or nanoscale hole. That is, the diameter of each of the holes 412 may be microscale or nanoscale. The size, i.e., diameter, of the through-holes 412 may be be uniform. Moreover, the holes 412 can be uniformly distributed throughout the porous membrane 410. Since the through-holes 412 have the fine and uniform size and are uniformly distributed throughout the membrane, nanoscale ultrafine dusts can be easily filtered.

In FIG. 4, the shape of each of the through-holes 412 is shown to be circular. However, the shape of each of the through-holes 412 is not limited thereto. Each of the first filter layer 510 contacting one side of the porous membrane 410 and the second filter layer 520 contacting the other side of the porous membrane 410 may be a nanofiber web made of nanofibers. In this connection, each of the first filter layer 510 and the second filter layer 520 may be embodied as a nonwoven fabric containing multiple pores generated when the nanofibers are irregularly arranged/stacked. The size of each of the pores may be several tens of micrometers or larger. The fine dusts may be firstly blocked by the first filter layer 510, and mainly blocked secondarily by the porous membrane 410, and then thirdly blocked by the second filter layer 520. That is, the fine dusts may be blocked at multiple times.

Although not shown in the drawing, the fine dust barrier mask 600 may further include additional filter layers disposed on the first and second filter layers 510 and 520, respectively, and may further include an outer skin contact layer.

Figure 5A:
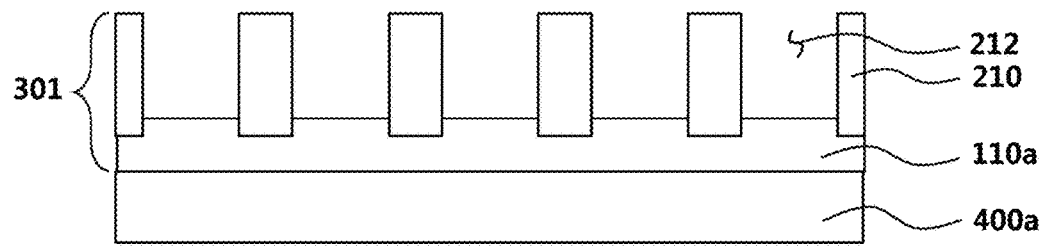
FIG. 5A and FIG. 5B are cross-sectional views for illustrating a method for manufacturing a porous membrane shown in FIG. 4.
Figure 5B:
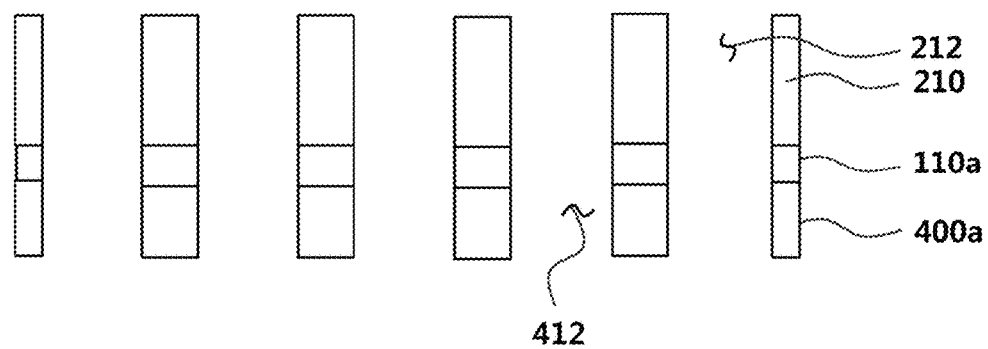

FIG. 5A and FIG. 5B are cross-sectional views for illustrating a method of manufacturing the porous membrane shown in FIG. 4

Referring to FIG. 5A, an elastic polymer film 400a is prepared, and an etching mask 301 is disposed on the elastic polymer film 400a.

The etching mask 301 is substantially the same as shown in FIG. 1 and FIG. 2, and, thus, detailed descriptions thereof will be omitted.

Since the portion of the etching mask 301 contacting the elastic polymer film 400a is the organic film 110a, the effective contact area between the etching mask 301 and the elastic polymer film 400a according to the present disclosure can be improved, compared to an etching mask made of only an inorganic material. The wider effective contact area can minimize the damage of the elastic polymer film 400a and organic film 110a other than an etched portion during the etching process.

Referring to FIG. 5B, in a state where the etching mask 301 is disposed on the elastic polymer film 400a, an etching process is performed to remove a portion of the etching mask 301 and a portion of the elastic polymer film 400a. The etching process is performed using dry etching using a plasma. The plasma is selected such that the organic material is etched while the metal is not etched. For example, the etching process may utilize oxygen plasma.

When the plasma is provided, a region where the plasma is blocked by the etching mask 301 remains, and the region exposed to the plasma is removed. First, the plasma etches the organic film 110a exposed through the openings 212 of the pattern layer 210 to form holes. Then, the plasma etches the elastic polymer film 400a exposed through the openings 212 and the formed holes. The holes in the organic film 110a are formed in a corresponding manner to the openings 212 respectively. Accordingly, multiple through-holes 412 are formed in the elastic polymer film 400a.

Upon completion of formation of the through holes 412, the etching mask 301 having the holes in the organic film 110a thereof is separated from the elastic polymer film 400a. Even with a very low external force application, the etching mask 301 can be easily separated. Thus, the organic film 110a and the elastic polymer film 440a may not be damaged.

In this way, the porous membrane 410 described above in FIG. 4 may be fabricated. Then, the porous membrane 410 may be assembled with the first and second filter layers 510 and 520 to produce the fine dust barrier mask 600.

As described above, since the porous membrane 410 is formed of the elastic polymer film 400a, an appropriate flexure strength of the porous membrane 410 may be ensured while having a small thickness, and the porous membrane 410 may be easily manufactured by using the etching mask 301 described in FIG. 1 and FIG. 2.

In the process of forming the porous membrane 410, the effective contact area between the elastic polymer film 400a and the etching mask 301 can be maximized, and, thus, the adhesion between the elastic polymer film 400a and the etching mask 301 can be improved. In addition, the etching mask 301 can be easily separated from the elastic polymer film 400a without damaging the organic film 110a and the elastic polymer film 400a. Further, the fine dust barrier mask 600 including the porous membrane 410 can improve the fine dust blocking performance while having a good fit with a body.

Figure 6:
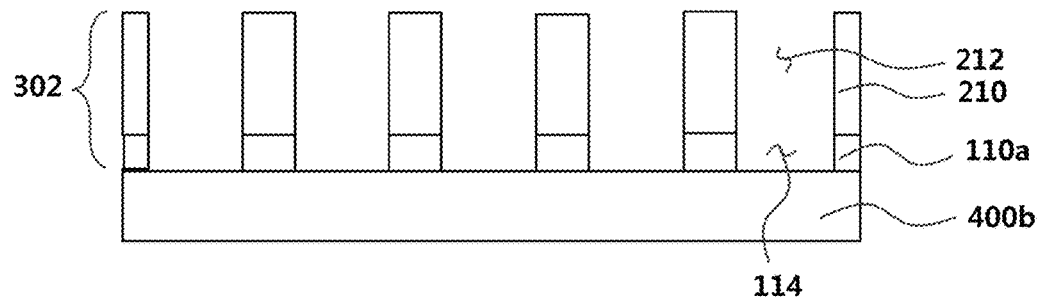
FIG. 6 is a cross-sectional view for illustrating a mask for etching according to another embodiment of the present disclosure and a method for manufacturing a porous membrane using the mask.

FIG. 6 is a cross-sectional view for illustrating an etching mask according to another embodiment of the present disclosure and a method for manufacturing a porous membrane using the same.

The etching mask 302 shown in FIG. 6 includes an organic film 110a and a pattern layer 210. The etching mask 302 of FIG. 6 is substantially the same as the etching mask 302 of FIG. 1 and FIG. 2 except that multiple holes 114 are formed in the organic film 110a. The holes 114 formed in the organic film 110a may correspond to the openings 212 in the pattern layer 210 respectively.

The etching mask 302 shown in FIG. 6 may be formed by operations as described in FIG. 3A to FIG. 3C and heat treatment/cooling process, and, further, an etching of the organic film 110a using the pattern layer 210 as an etch stopping layer. Alternatively, the etching mask 302 may be fabricated via an imprinting or etching process and a heat treatment/cooling process. In this connection, since each process or operation thereof is substantially the same as that described above, the detailed description thereof will not be repeated.

Alternatively, the etching mask 302 shown in FIG. 6 can be prepared using the etching mask 301 described above in FIG. 1 and FIG. 2. That is, in order to form the etching mask 302 shown in FIG. 6, the etching mask 301 described in FIG. 1 and FIG. 2 may be used at least one time.

Specifically, using the etching mask 301 described in FIG. 1 and FIG. 2, the porous membrane as shown in FIG. 4 may be formed, so that the holes 114 are formed in the organic film 110a. The etching mask 302 including the pattern layer 210 and the organic film 110a having the holes 114 formed therein can be used for etching a new elastic polymer film 400b, that is, the etching mask 302 may be reused. In this connection, in an etching process that forms through-holes 412 in the new elastic polymer film 400b, the new elastic polymer film 400b may be exposed through the openings 212 of the pattern layer 210 and the holes 114 of the organic film 110a to the plasma and the exposed portions thereof may be etched away.

The organic film 110a having the holes 114 has a good adhesion with the with the new elastic polymer film 400b due to the increased effective contact area between the organic film 110a and the new elastic polymer film 400b compared to a mask including only the pattern layer 210. At the same time, the etching mask 302 shown in FIG. 6 can be easily separated from the new elastic polymer film 400b.

Figure 7:
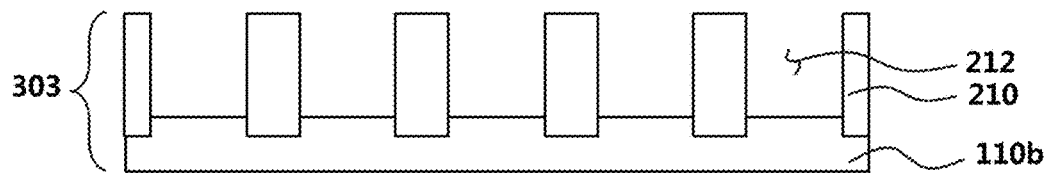
FIG. 7 is a cross-sectional view for illustrating reuse of the etching mask shown in FIG. 6.

FIG. 7 is a cross-sectional view for illustrating the reuse of the etching mask shown in FIG. 6.

Referring to FIG. 7, the etching mask 303 is substantially the same as the etching mask 301 described in FIG. 1 and FIG. 2 except that the etching mask 303 include a different new organic film 110a from the organic film 110a as described in FIG. 1 and FIG. 2. Although the new organic film 110b is made of substantially the same compound as the organic film 110a as described in FIG. 1 and FIG. 2, the new organic film 110b is combined after the organic film 110a described in FIG. 1, FIG. 2 and FIG. 6 has removed.

That is, for the etching masks 301 and 302 described in FIG. 1 and FIG. 2 and FIG. 6, the organic film 110a may be damaged by plasma in the etching process or consumed by continuous use. Accordingly, the organic film 110a may be removed, and, then, the pattern layer 210, which is hardly damaged by the plasma, may be combined with the new organic film 110b, thereby form an etching mask 303 for reuse. The etching mask 303 can be easily prepared again by bonding the new organic film 110b to the pattern layer 210 and, then, subjecting the bonded structure to a heat treatment/cooling process.

Referring to FIG. 6 and FIG. 7, the etching mask 301 as shown in FIG. 1 and FIG. 2 may be reused as it is as described above with reference to FIG. 6, or the etching mask 301 as shown in FIG. 1 and FIG. 2 may be used as described above with reference to FIG. 7 by replacing the old organic film 110a thereof with the new organic film 110b. Thus, the fabrication cost of the etching mask 301 and, hence, the cost of the plasma etching process using the etching mask 301 can be reduced. Further, the production cost of the porous membrane 410 manufactured using the etching mask 301, and, hence, the fine dust barrier mask 600 including the porous membrane 410 can be reduced. In this way, the productivity thereof can be improved.

Figure 8:
FIG. 8 is SEM photographs of a porous membrane and etching mask according to the present disclosure.

FIG. 8 is a SEM photograph of a porous membrane and an etching mask according to the present disclosure.

Referring FIG. 8, (a) indicates a SEM photograph corresponding to the porous membrane 412 described in FIG. 4; (b) indicates a SEM image corresponding to the etching mask 301 described in in FIG. 1 and FIG. 2; and (c) indicates a SEM image illustrating a state where the porous membrane 412 described in FIG. 4 is disposed beneath a support having pores having a width of about 50 micrometer.

As shown in FIG. 8 (b), an etching mask having an organic film and a pattern layer formed thereon, the pattern layer having formed therein nano-holes having a uniform size, is easily manufactured. Using the etching mask, the porous membrane having formed therein the through-holes having a uniform diameter as shown in FIG. 8 (a) may be formed. Referring to FIG. 8 (c), it may be seen that the porous membrane can be stably transferred to the support having pores having a size of several tens of micrometers because the porous membrane has fine through-holes.

Hereinafter, Referring to FIG. 9 to FIG. 15, a surface enhanced Raman scattering active substrate in accordance with one embodiment of the present disclosure and a method for producing the same will be described.

Figure 9:
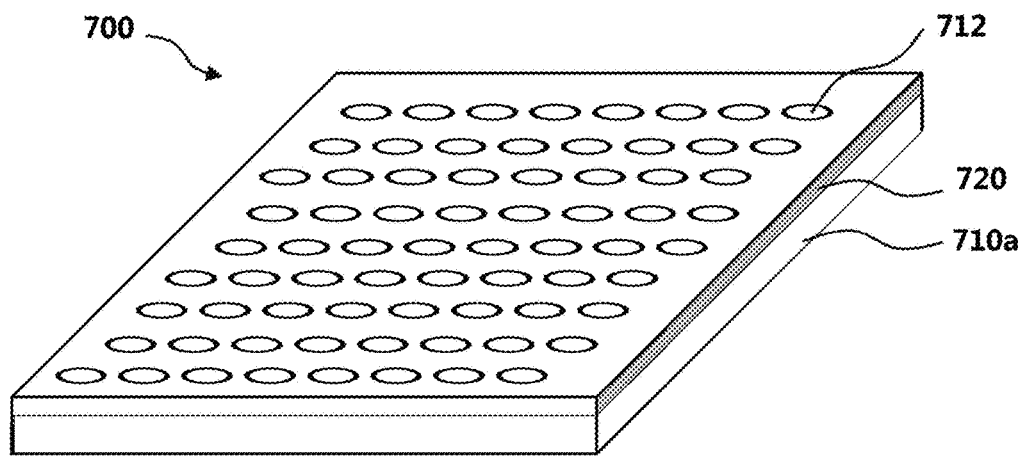
FIG. 9 is a perspective view of a surface enhanced Raman scattering active substrate according to one embodiment of the present disclosure.
Figure 10:
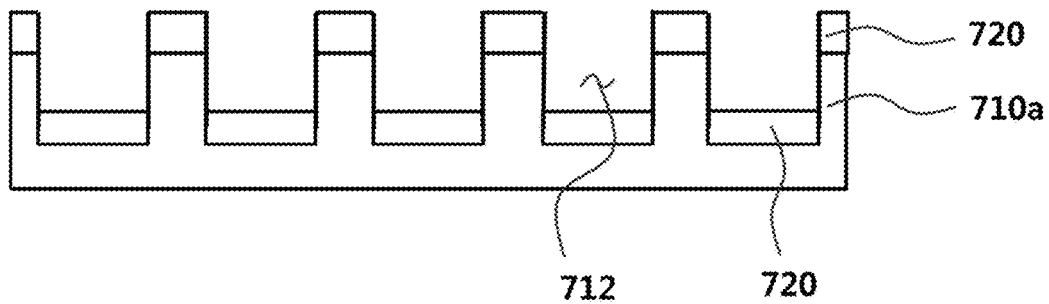
FIG. 10 is a cross-sectional view of the surface enhanced Raman scattering active substrate shown in FIG. 9.

FIG. 9 shows a perspective view of a surface enhanced Raman scattering active substrate in accordance with one embodiment of the present disclosure. FIG. 10 shows a cross-sectional view of the surface enhanced Raman scattering active substrate as shown in FIG. 9.

Referring to FIG. 9 and FIG. 10, the surface enhanced Raman scattering active substrate 700 may include a base substrate 710a and a metal layer 720.

The base substrate 710a may include multiple pores 712. The size of each of the pores 712 is uniform. In this connection, the size of each of the pores 712 means the diameter and/or depth thereof, and the uniform size means that the diameter and/or depth of each of the pores 712 is uniform. The pores 712 may be uniformly arranged throughout the base substrate 710a. The base substrate 710a may be embodied as a flexible film, a rigid paper, a fiber, a textile, etc.

The base substrate 710a may be made of a polymer. The polymer may comprise a synthetic polymer or a natural polymer. The synthetic polymer and the natural polymer may be the same as the material for the organic film 110a as described above with reference to FIG. 1. Therefore, redundant detailed descriptions thereof may be omitted.

Alternatively, the base substrate 710a may be embodied as a glass ($SiO_2$) substrate, a germanium (Ge) substrate, a silicon wafer (Si) wafer, or the like. However, when the base substrate 710a is made of the polymer, the substrate 710 may be stably attached to an organic film 810*a* of an etching mask 801 (FIG. 11), which is more advantageous for the patterning process.

The metal layer 720 may be formed on the base substrate 710*a*. The metal layer 720 may be formed in the pores 712, strictly, on bottoms of the pores 712. At the same time, the metal layer 720 may be formed on the top of a sidewall portion connected to the bottom portion for defining the pore 712. Example materials of the metal layer 720 may include gold (Au), silver (Ag), copper (Cu), palladium (Pd), platinum (Pt), aluminum (Al), nickel (Ni), ruthenium (Ru), rhodium (Rh), iron (Fe), cobalt (Co), tin (Sn), zinc (Zn), etc. These may be used alone or in a form of an alloy of two or more. In this connection, not only a pure metal but also a metal oxide thereof may be used. For example, the metal oxide may be selected from the group consisting of silver oxide ($Ag_2O$), copper oxide (CuO), tin oxide ($SnO_2$), nickel oxide (NiO), zinc oxide (ZnO), titanium oxide ($TiO_2$), and the like.

Figure 11A:
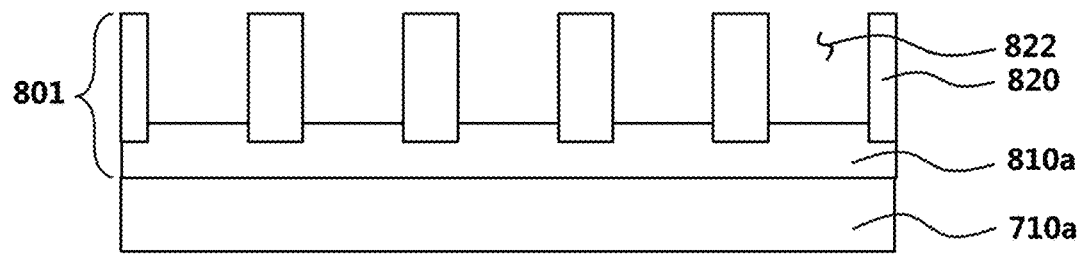
FIG. 11A and FIG. 11B are cross-sectional views for illustrating a method for manufacturing the surface enhanced Raman scattering active substrate shown in FIG. 10.
Figure 11B:
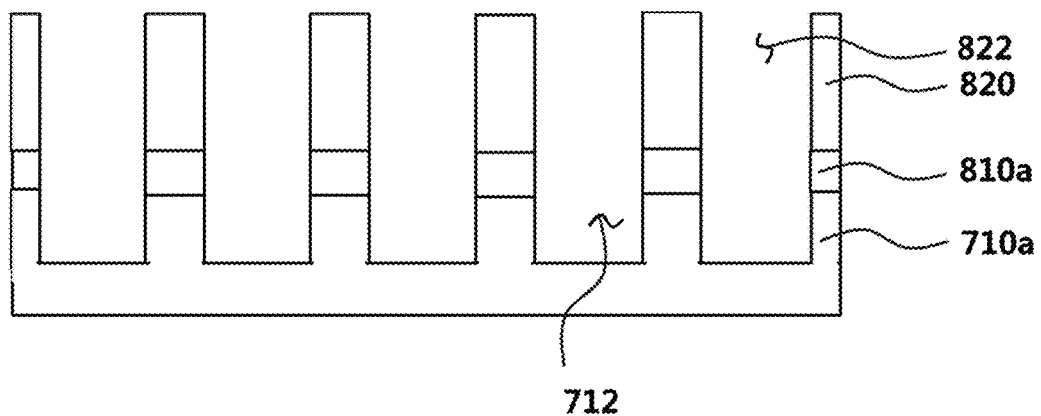

FIG. 11A and FIG. 11B are cross-sectional views for illustrating a method for manufacturing the surface enhanced Raman scattering active substrate shown in FIG. 10.

Referring to FIG. 11A, a base substrate 710*a* is prepared, and, then, an etching mask 801 is placed on the base substrate 710*a*.

The etching mask 801 may include an organic film 810*a* and a pattern layer 820. The etching mask 801 of FIG. 11A is substantially the same as the etching mask as shown in FIG. 2. Therefore, redundant detailed descriptions thereof will be omitted.

Referring to FIG. 11B, in a state where the etching mask 801 is disposed on the substrate 710*a*, the base substrate 710*a* is etched using plasma to form multiple pores 712 therein.

The plasma is selected such that the organic material is etched while the metal is not etched. For example, the etching process may utilize oxygen plasma.

When the plasma is provided, the region where the plasma is blocked by the etching mask 801 remains, and the region exposed to the plasma is removed. First, the plasma etches the organic film 810*a* exposed through the openings 822 of the pattern layer 820 to form holes therein, and then, the plasma etches the base substrate 710*a* exposed through the openings 822 and the formed holes are secondarily etched. The holes of the organic film 810*a* are formed in a corresponding manner to the openings 822, respectively. Accordingly, multiple pores 712 are formed in the base substrate 710*a*.

After forming the pores 712, the etching mask 801 having the organic film 810*a* having the holes formed therein is removed from the base substrate 710*a*. Since the organic film 810*a* is formed of an organic material that allows separation between the base substrate 710*a* and the organic film 810*a* without damaging the base substrate 710*a* and the organic film 810*a*, the etching mask 801 can be easily separated from the base substrate 710*a* with a very low external force. Thus, the base substrate 710*a* and the organic film 810*a* may not be damaged.

Next, the metal layer 720 is formed on the base substrate 710*a* in which the pores 712 are formed. The metal layer 720 may be formed by sputtering.

According to the above description, the surface enhanced Raman scattering active substrate 700 can be easily manufactured via a simple process including a step of etching using the etching mask 801 described in 11A and a step of coating the metal layer 720. Accordingly, the manufacturing time can be shortened. Since the base substrate 710*a* is already patterned to form the pores 712 therein, and then, the metal layer 720 is formed on the base substrate 710 in a corresponding pattern to the pores pattern, a separate interlayer film for improving the adhesion of the metal layer 720 is not required. In addition, since the etching mask 801 may be reused, the manufacturing cost of the surface enhanced Raman scattering active substrate 700 can be reduced by manufacturing the surface enhanced Raman scattering active substrate 700 using the etching mask 801. The reuse of the etching mask 801 is substantially the same as that as shown in FIG. 6 and FIG. 7, and therefore redundant detailed descriptions thereof may be omitted.

Figure 12:
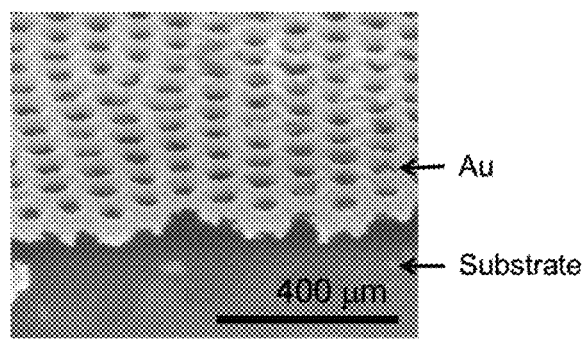
FIG. 12 is an SEM photograph of the surface-enhanced Raman scattering active substrate prepared according to the present disclosure.

FIG. 12 is an SEM photograph of the surface-enhanced Raman scattering active substrate prepared according to the present disclosure.

Referring to FIG. 12, it may be confirmed that the surface enhanced Raman scattering active substrate can be actually produced by etching the base substrate 710*a* made of a polymer using the etching mask 801 as shown in FIG. 11A, and, then, coating gold thereon.

The description of the disclosed embodiments is provided to enable any person skilled in the art to make or use the present disclosure. Various modifications to these embodiments will be readily apparent to those skilled in the art. The generic principles defined herein may be applied to other embodiments without departing from the scope of the present disclosure. Thus, the present disclosure is not to be limited to the embodiments shown herein but is to be accorded the widest scope consistent with the principles and novel features presented herein.

What is claimed is:

1. A method for manufacturing an etching mask, the method comprising:
   providing an organic film; and
   forming a pattern layer on the organic film, wherein the pattern layer has openings defined therein, wherein each of the openings includes a micro-scale or nano-scale hole,
   wherein forming the pattern layer on the organic film comprises:
   placing the pattern layer on the organic film;
   heating the organic film together with the pattern layer to a temperature equal to or above a glass transition temperature of the organic film under a vacuum or reduced pressure; and
   cooling the pattern layer and the organic film.

2. The method of claim 1, wherein the organic film is exposed through the openings in the pattern layer, wherein the method further comprises, after forming the pattern layer, forming holes in the organic film by removing the exposed organic film through the openings.

3. A method for manufacturing a porous substrate, the method comprising:
   providing a base substrate;
   placing an etching mask made by the method of claim 1 on a polymer film; and
   forming multiple through-holes in the base substrate by plasma-etching the base substrate using the etching mask.

4. The method of claim 3, wherein forming the through-holes comprises etching the organic film and the base substrate using oxygen plasma.

5. The method of claim 4, wherein the pattern layer is made of a metal oxide.

6. The method of claim 3, wherein the organic film has holes defined therein corresponding to the openings in the pattern layer respectively.

7. The method of claim 3, after forming multiple through-holes, further comprising:
   forming a metal layer on the base substrate having the pores defined therein,
   wherein the base substrate having pores defined therein and the metal layer thereon is a surface enhanced Raman scattering active substrate.

8. The method of claim 3, wherein the base substrate is made of a polymer.

* * * * *